United States Patent
Dinger

(10) Patent No.: US 10,717,518 B2
(45) Date of Patent: Jul. 21, 2020

(54) AVIATION ACTUATOR ASSEMBLY WITH MECHANICAL FUSE

(71) Applicant: Garmin International, Inc., Olathe, KS (US)

(72) Inventor: Perry L. Dinger, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 340 days.

(21) Appl. No.: 15/901,773

(22) Filed: Feb. 21, 2018

(65) Prior Publication Data

US 2019/0256196 A1 Aug. 22, 2019

(51) Int. Cl.
*B64C 13/28* (2006.01)
*F16D 9/06* (2006.01)

(52) U.S. Cl.
CPC ............... *B64C 13/28* (2013.01); *F16D 9/06* (2013.01)

(58) Field of Classification Search
CPC ......................................................... F16D 9/06
See application file for complete search history.

(56) References Cited

U.S. PATENT DOCUMENTS

| | | | | |
|---|---|---|---|---|
| 2,680,359 A * | 6/1954 | Bowers | ...................... | F16D 9/06 464/33 |
| 3,908,513 A | 9/1975 | Leoni | | |
| 5,004,028 A * | 4/1991 | Adams | .................... | B02C 18/24 144/176 |
| 5,443,372 A * | 8/1995 | Kanoll | ...................... | F16D 9/06 417/319 |
| 6,402,469 B1 * | 6/2002 | Kastl | ..................... | F01D 21/045 415/9 |
| 8,303,423 B2 * | 11/2012 | Takai | ....................... | F16D 9/06 464/32 |
| 8,366,556 B2 * | 2/2013 | Copeland | ................. | F16D 9/06 403/2 |
| 9,997,875 B2 * | 6/2018 | Roe | .......................... | F16D 9/06 |

FOREIGN PATENT DOCUMENTS

DE 2729041 A1 * 1/1979 ............... F16D 9/06

OTHER PUBLICATIONS

Technical Manual Operator's Manual for Helicopter, Attack AH-64A Apache, Headquarters Department of the Army, Aug. 31, 1994.
TruTrak Servo Shear Pin, Vansairforce.net Forums, http://www.vansairforce.com/community/showthread.php?t=36476, Nov. 2008.

* cited by examiner

*Primary Examiner* — Brian M O'Hara
(74) *Attorney, Agent, or Firm* — Samuel M. Korte; Max M. Ali

(57) ABSTRACT

An aviation actuator assembly for various aviation servo and/or autopilot applications can include an actuator having an output shaft and a mechanical fuse for joining to the output shaft and another rotating body. The mechanical fuse can include a fuse body having a first connection point for joining to the output shaft, a second connection point for joining to the rotating body, and at least one channel defined in the fuse body. The first connection point and the second connection point are configured to be disposed in a line generally parallel to a common axis of rotation of the output shaft and the rotating body. The fuse body has a generally flat cross-sectional profile along its length between the first connection point and the second connection point, and the channel extends generally perpendicular to the length of the fuse body and narrows the cross-sectional profile.

14 Claims, 17 Drawing Sheets

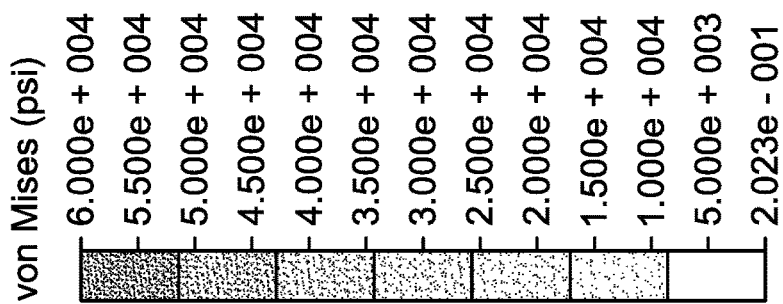
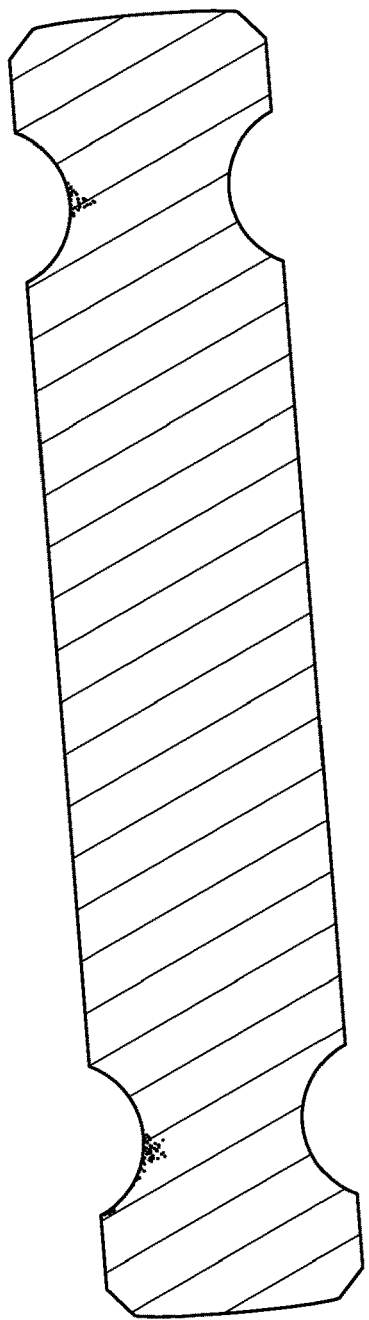
FIG. 8B (PRIOR ART)

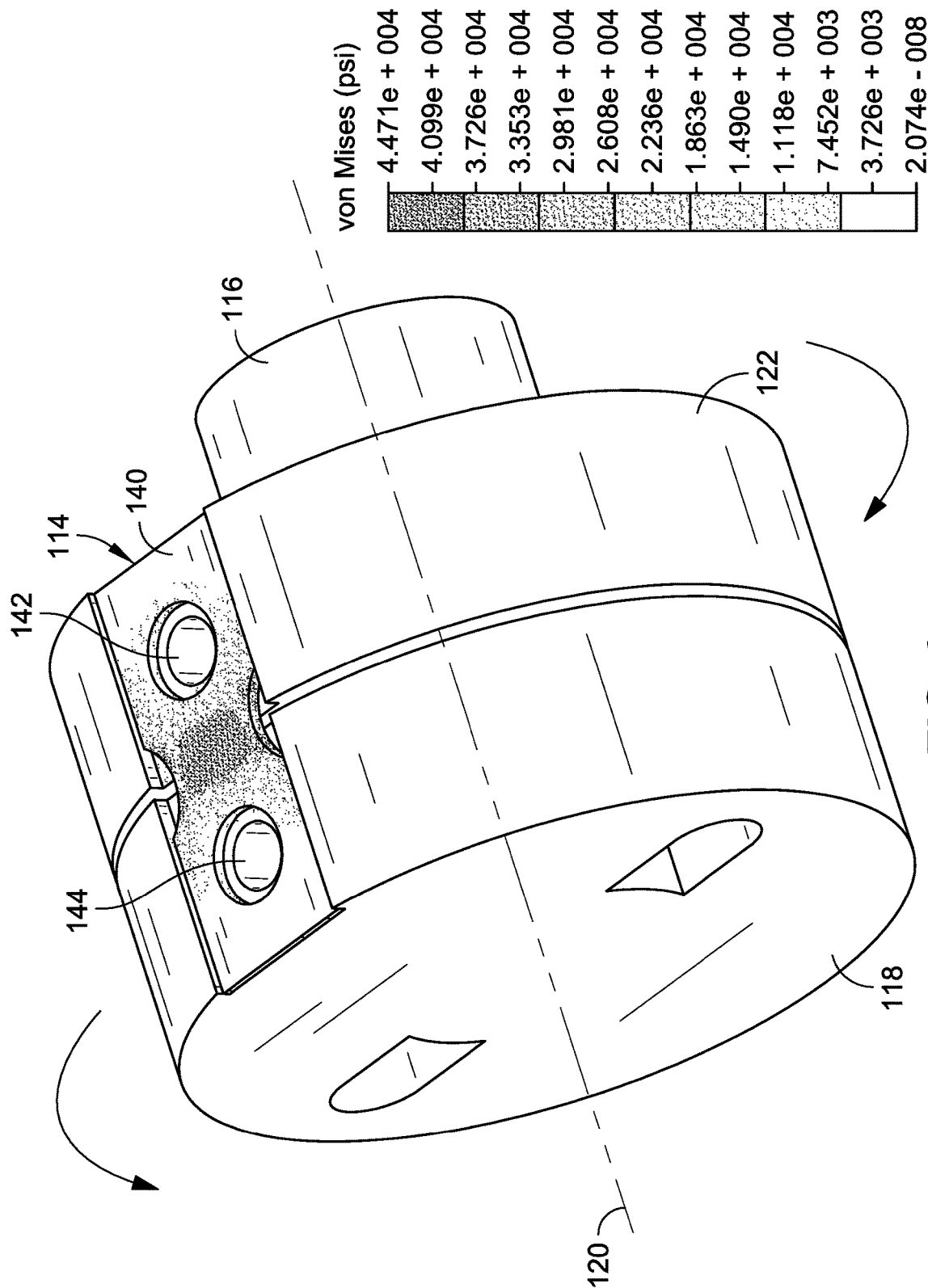

AVIATION ACTUATOR ASSEMBLY WITH MECHANICAL FUSE

BACKGROUND

An autopilot system can be used to control flight characteristics of an aircraft (e.g., pitch and roll, yaw, climb and descent, etc.) without constant hands-on control by a pilot/human operator. Under certain conditions, autopilot systems can be configured to be mechanically disengaged from a flight control mechanism (e.g., control stick, yoke, etc.) and thereby overridden by a pilot, typically by breaking a shear pin that mechanically fuses the flight control mechanism with a component of the autopilot systems, such as a servo.

DRAWINGS

The Detailed Description is described with reference to the accompanying figures. The use of the same reference numbers in different instances in the description and the figures may indicate similar or identical items.

FIG. 8B is a cross-sectional side view illustrating a finite element analysis (FEA) representation of a prior art cylindrical shear pin for installing through a shaft of an aviation actuator in a double shear configuration and stress points on the mechanical fuse.

FIG. 9 is a partial isometric view illustrating a finite element analysis (FEA) representation of an aviation actuator assembly for an aviation autopilot system, such as the aviation autopilot system illustrated in FIG. 1, including a mechanical fuse in accordance with an example embodiment of the present disclosure.

DETAILED DESCRIPTION

Figure 1:
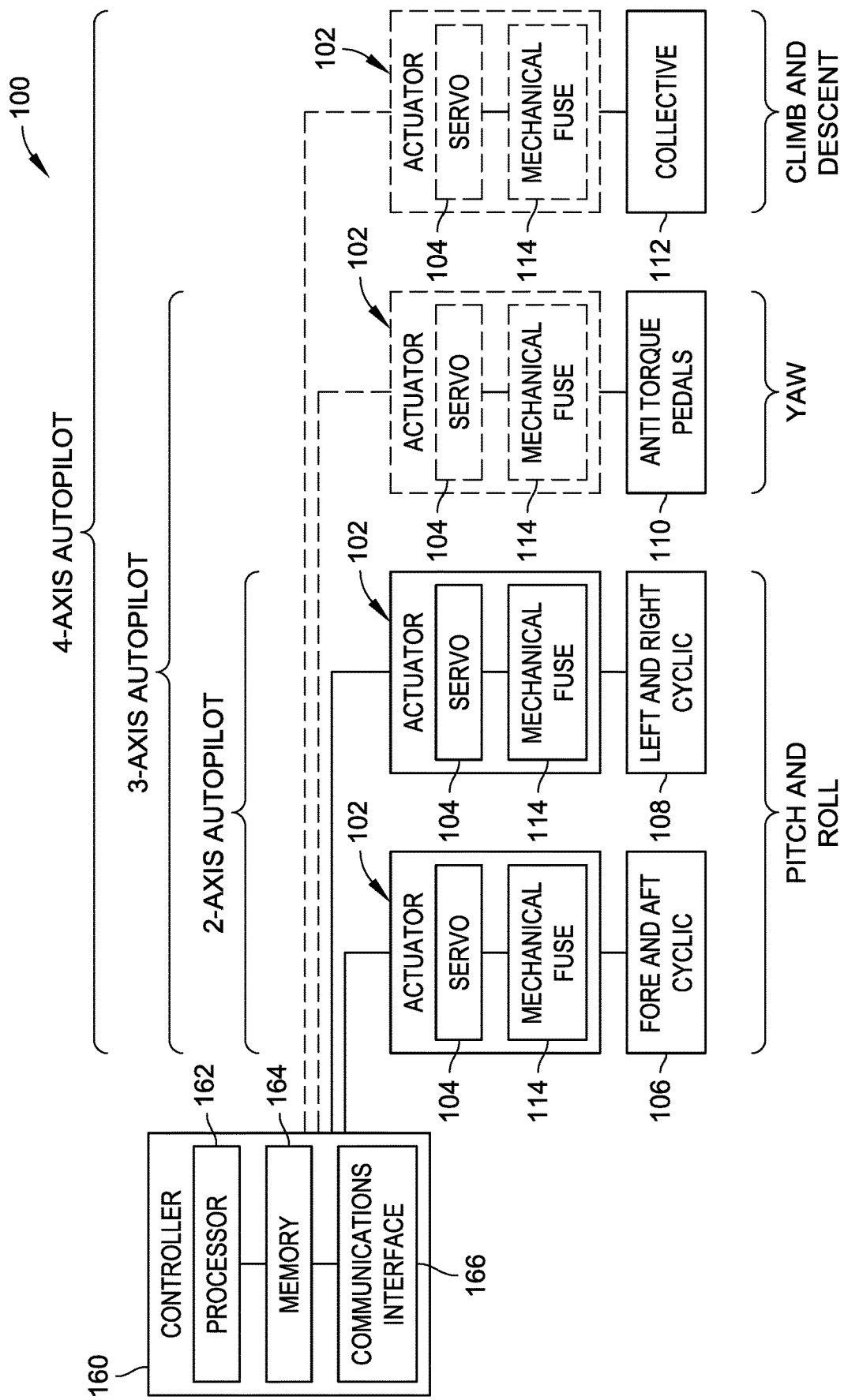
FIG. 1 is a block diagram illustrating aviation autopilot systems for a helicopter including aviation actuator assemblies in accordance with example embodiments of the present disclosure.
Figure 2:
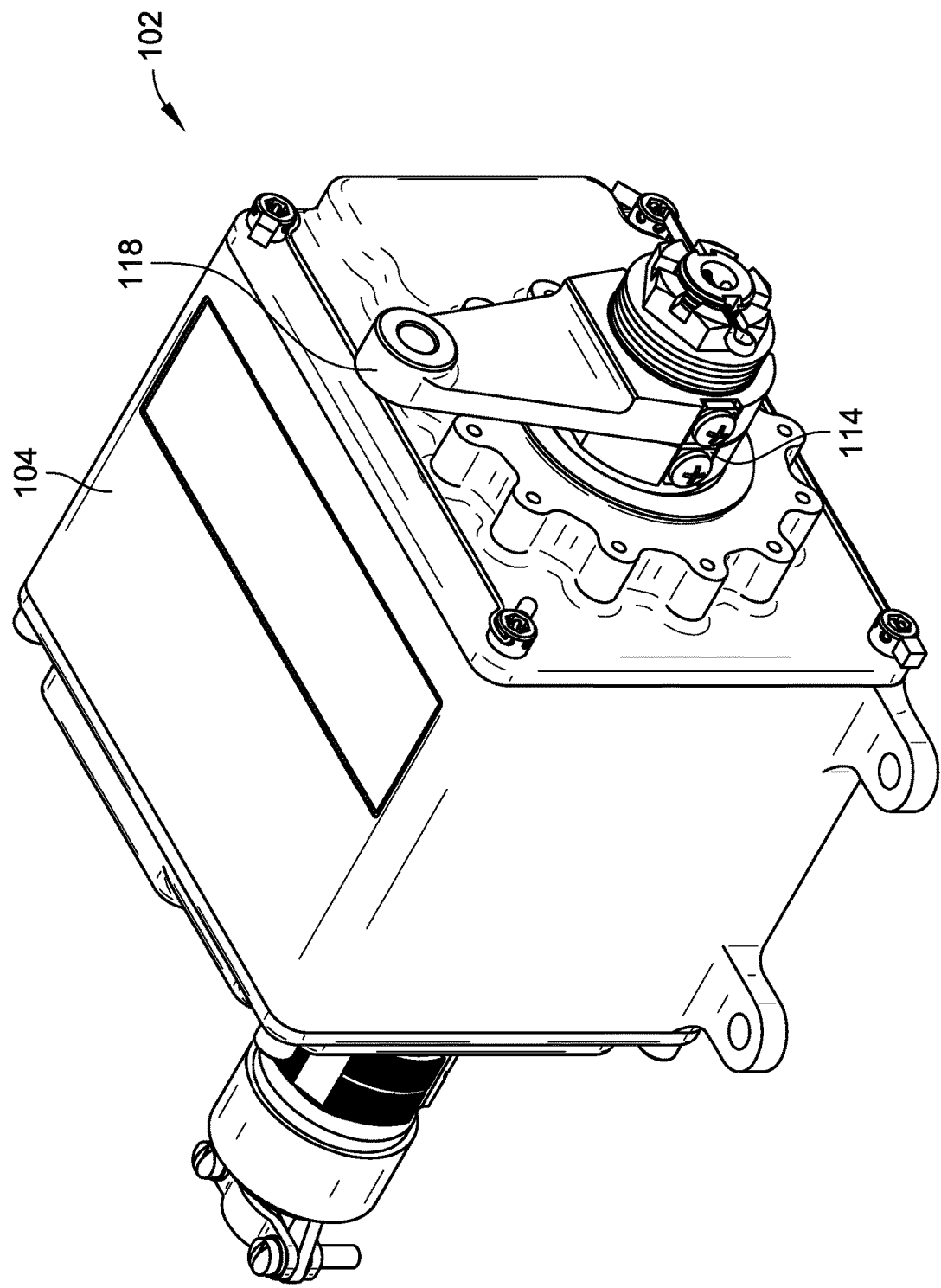
FIG. 2 is an isometric view illustrating an aviation actuator assembly for an aviation autopilot system, such as the aviation autopilot system illustrated in FIG. 1, where the aviation actuator assembly includes a servo and a mechanical fuse in accordance with an example embodiment of the present disclosure.

Referring generally to FIGS. 1 through 20, an aviation autopilot system 100 that includes aviation actuator assemblies 102 are described. In embodiments of the disclosure, an aviation actuator assembly 102 can be used for various aviation servo and/or autopilot applications. For example, a helicopter may use multiple (e.g., two (2), three (3), four (4), more than four (4), etc.) electro-mechanical actuators (e.g., servos 104) with a stability augmentation system (SAS) for flight controls, such as an active augmentation system, an autopilot system, and so forth. For instance, one motor (e.g., servo 104) can be used to provide input to a hydraulic servo of a fore and aft cyclic 106 and another motor (e.g., servo 104) can be used to provide input to a hydraulic servo of a left and right cyclic 108 (e.g., in the case of a two-axis autopilot system for stabilizing and/or automatically controlling pitch and roll). Further, in some embodiments an additional motor (e.g., servo 104) may be used to provide input to a hydraulic servo of antitorque pedals 110 (e.g., in the case of a three-axis autopilot system for stabilizing and/or automatically controlling yaw), another motor (e.g., servo 104) may be used to provide input to a hydraulic servo of a collective 112 (e.g., in the case of a four-axis autopilot system for stabilizing and/or automatically controlling climb and descent), and so on. However, aviation actuator assemblies 102 as described herein may be used in any aircraft environment, including fixed-wing aircraft such as airplanes.

In addition to an actuator/servo 104, an aviation actuator assembly 102 can include a mechanical fuse 114 for coupling or joining a first rotating body (e.g., an output shaft 116 of the servo 104) to a second rotating body (e.g., an arm 118, such as an arm for connecting to a hydraulic servo). The mechanical fuse 114 thus may connect the output shaft 116 and the arm 118 together so that rotational forces from one of the output shaft 116 or the arm 118 can be imparted to the other of the output shaft 116 or the arm 118 through the connecting mechanical fuse 114. For example, as the output shaft 116 of the servo 104 is driven to an angle relative to the servo 104, an unsheared mechanical fuse 114 may case the arm 118 to be driven to the same angle relative to the servo 104 when connected by the mechanical fuse 114. In embodiments of the disclosure, the output shaft 116 and the arm 118 share a common axis of rotation 120.

In embodiments of the disclosure, the mechanical fuse 114 can be broken by a pilot/operator to enable the pilot to disengage (free) the control system of the aviation autopilot system 100 from an autopilot motor without requiring input of undue or excessive force to do so, which may cause placing the aircraft in an undesired position. For example, with a helicopter, a conventional autopilot system that detects a failure and then uses an electromagnetic clutch to release a driving shaft presents the added difficulty that the pilot is left with a complicated control system that does not necessarily move to a stable position based on the heading and orientation of the helicopter. This operational characteristic is in contrast to an airplane, where a control position may tend to reflect the current operational orientation of the plane (e.g., yaw, pitch, etc.). Thus, an overpower mechanism like the aviation actuator assemblies 102 described herein can be used to allow the pilot to break the connection to the motor and thereby disengage the motor of the autopilot system 100 while still maintaining tactile feel and control of the position of the flight control mechanism (e.g., control stick).

Figure 3:
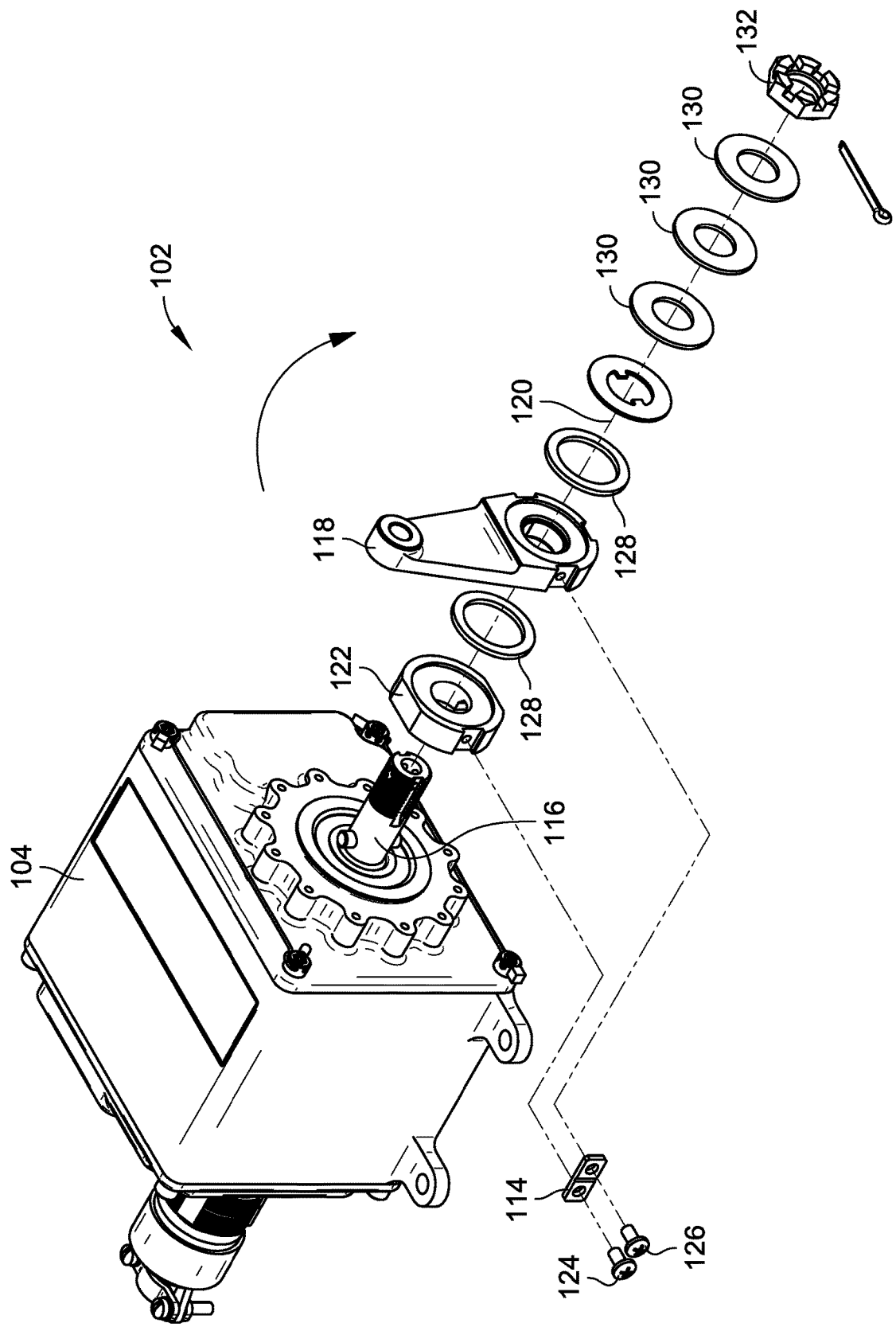
FIG. 3 is an exploded isometric view of the aviation actuator assembly illustrated in FIG. 2.

Referring to FIG. 3, an aviation actuator assembly 102 can include a hub 122 connected to an output shaft 116 of a servo 104 and a mechanical fuse 114 having a first opening through which a first fastener (e.g., screw 124) may pass. A second fastener (e.g., screw 126) may pass through a second opening of the mechanical fuse 114 to connect the mechanical fuse 114 to the arm 118. In some embodiments, one or more of the screws 124 and 126 can pass through and be connected to the mechanical fuse 114 with, for example, a lock washer (not shown). An aviation actuator assembly 102 can also include one or more friction washers 128, Belleville washers/disc springs 130, castle nuts 132, and so forth, which can be used to connect the arm 118 to the output shaft 116 and/or to retain the arm 118 on the output shaft 116. A friction washer 128 may provide consistent spacing between the arm 118 against the hub 122 regardless of whether mechanical fuse 114 is sheared or unsheared. However, this configuration is provided by way of example and is not meant to limit the present disclosure. In other embodiments, different hardware can be used to connect an output shaft 116 of a servo 114 to another rotating body, such as an arm 118.

Figure 4:
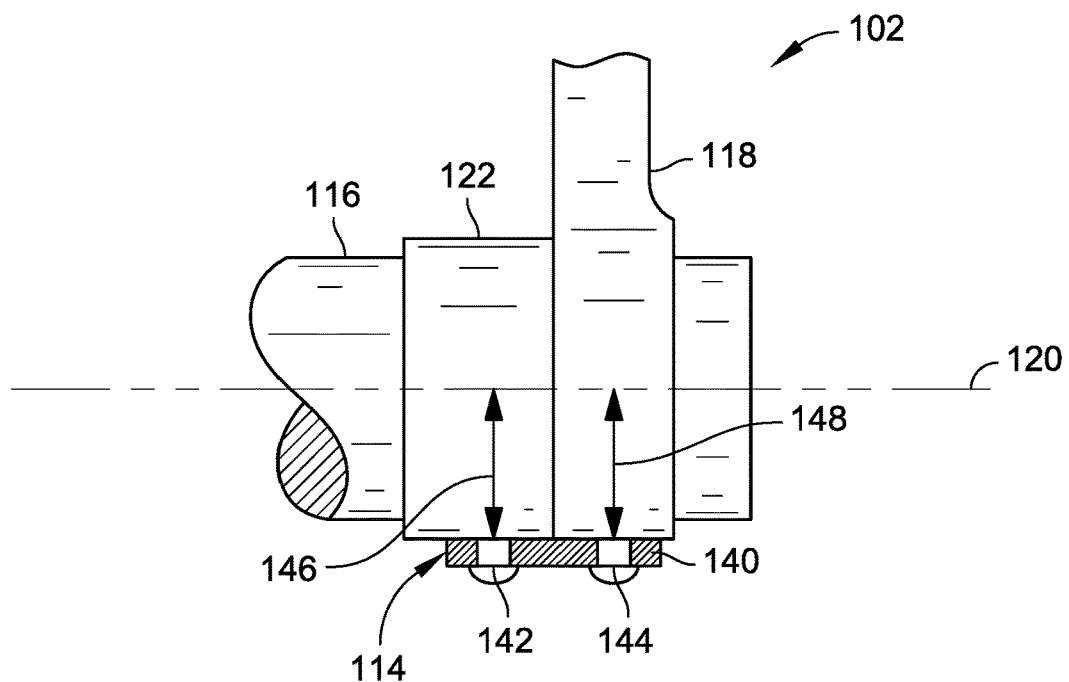
FIG. 4 is a partial side elevation view illustrating an aviation actuator assembly for an aviation autopilot system, such as the aviation autopilot system illustrated in FIG. 1, in accordance with an example embodiment of the present disclosure.
Figure 5:
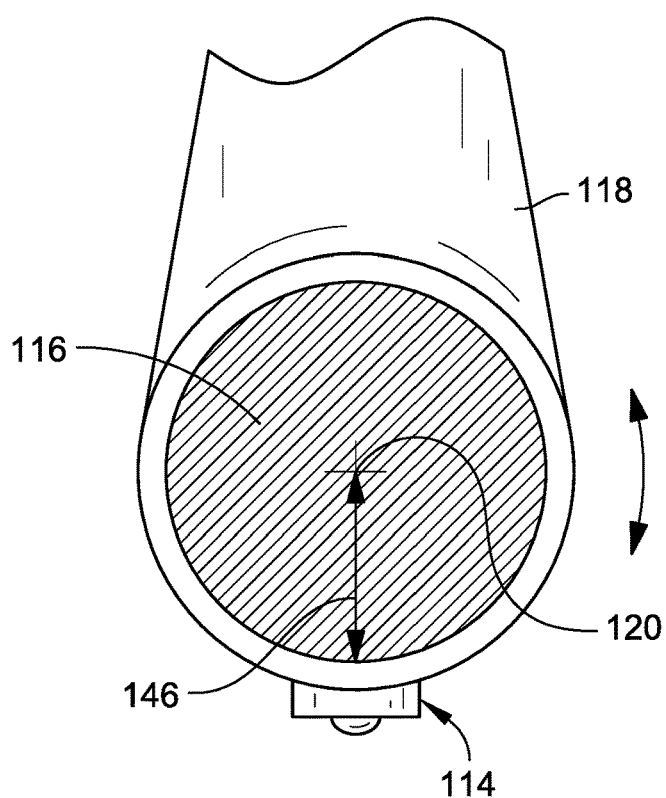
FIG. 5 is a partial cross-sectional end elevation view illustrating a shaft portion of an aviation actuator assembly for an aviation autopilot system, such as the aviation autopilot system illustrated in FIG. 1, in accordance with an example embodiment of the present disclosure.
Figure 7B:
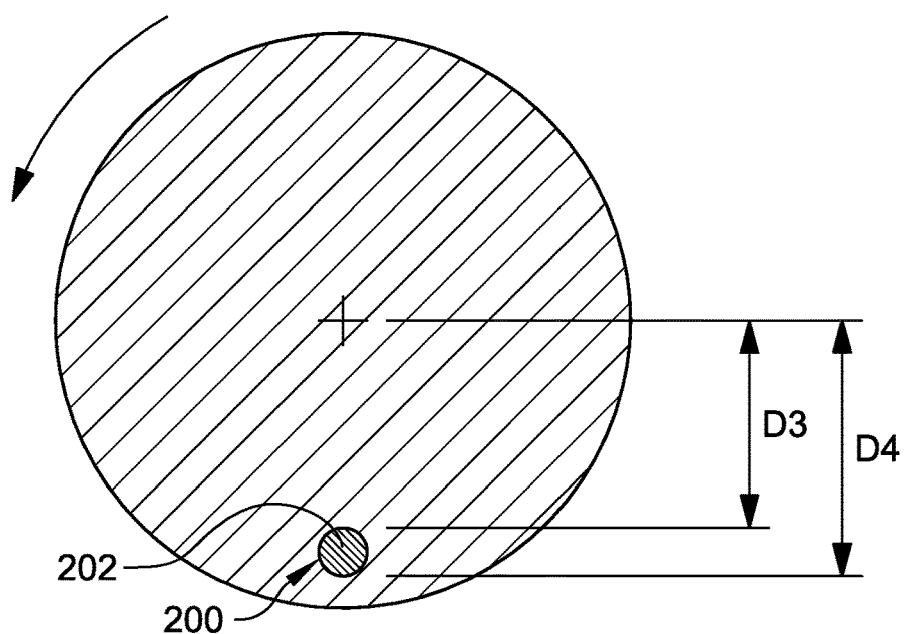
FIG. 7B is a partial cross-sectional side elevation view illustrating a prior art aviation actuator assembly for the aviation autopilot system of FIG. 7A.

Referring now to FIGS. 4 through 6, the mechanical fuse 114 includes a fuse body 140 having a first connection point 142, such as a first opening, for joining the mechanical fuse 114 to the first rotating body/output shaft 116 and a second connection point 144, such as a second opening, for joining the mechanical fuse 114 to the second rotating body/arm 118. In embodiments of the disclosure, the first connection point 142 and the second connection point 144 are configured to be disposed in a line generally parallel to the axis of rotation 120 of the output shaft 116 and the arm 118. Further, the first connection point 142 and the second connection point 144 are each disposed at a radial distance from the axis of rotation 120 when joined to the output shaft 116 and the arm 118. For instance, a first radial distance 146 of the first connection point 142 from the axis of rotation 120 may be the same (or at least substantially the same) as a second radial distance 148 of the second connection point 144 from the axis of rotation 120 (e.g., as described with reference to FIGS. 4 and 5). However, in other embodiments, the first radial distance 146 from the axis of rotation 120 may be the different from (e.g., greater or less than) the second radial distance 148 from the axis of rotation 120.

Figure 6A:
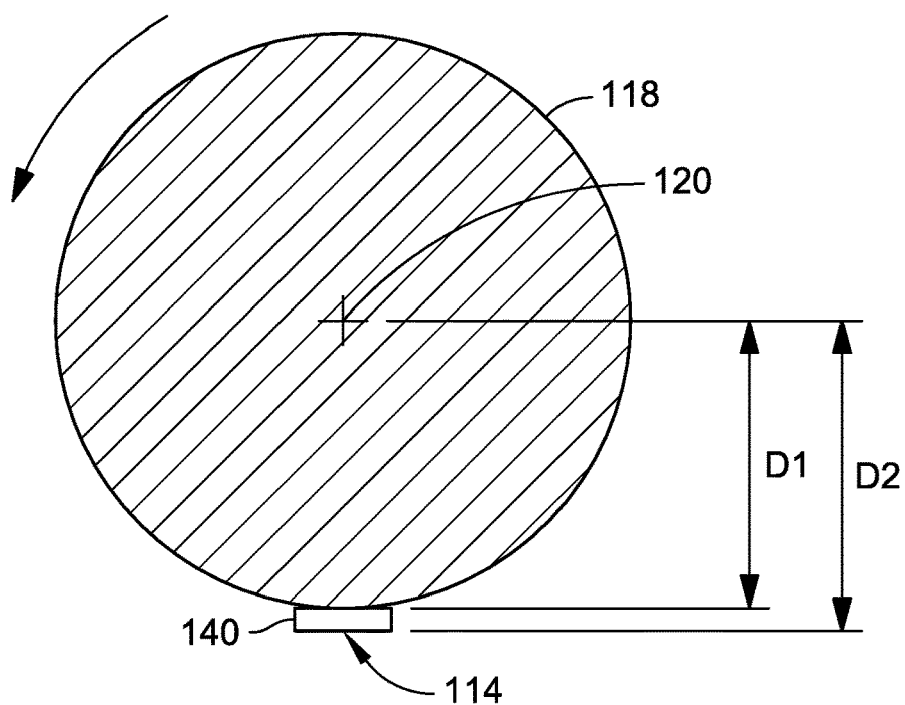
FIG. 6A is a partial cross-sectional end elevation view illustrating an aviation actuator assembly for an aviation autopilot system, such as the aviation autopilot system illustrated in FIG. 1, in accordance with an example embodiment of the present disclosure.
Figure 6B:
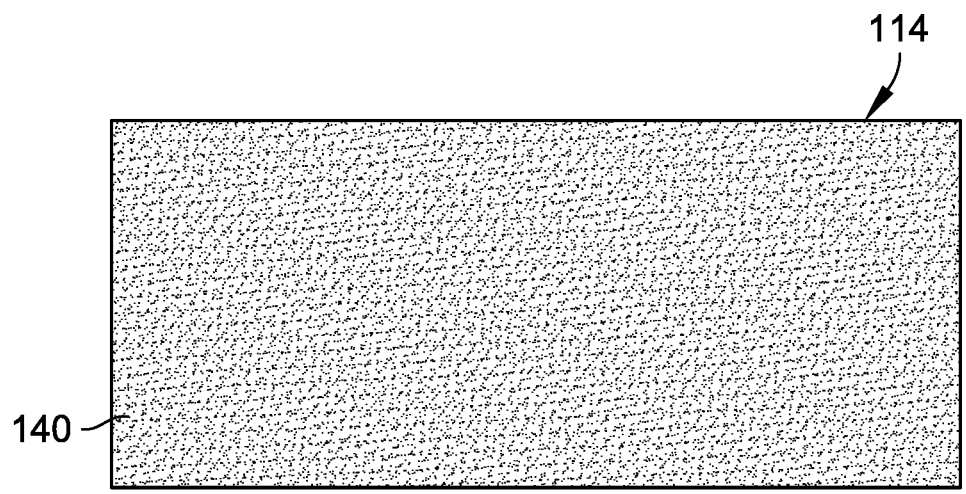
FIG. 6B is a partial cross-sectional end elevation view illustrating stress in a mechanical fuse for an aviation actuator assembly for an aviation autopilot system, such as the aviation autopilot system illustrated in FIG. 1, in accordance with an example embodiment of the present disclosure.

In embodiments of the disclosure, the fuse body 140 of the mechanical fuse 114 has a generally flat (e.g., rectangular) cross-sectional profile along a length of the fuse body 140 between the first connection point 142 and the second connection point 144. As described with reference to FIGS. 6A-6B, the flat or rectangular geometry of the fuse body 140 allows much of its cross-sectional area to be generally equidistant from the axis of rotation 120 of the arm 118. For example, the first radial distance 146 from the axis of rotation 120 of the arm 118 to one side of the mechanical fuse 114 is about the same as the second radial distance 148 from the axis of rotation 120 of the arm 118 to the other side of the mechanical fuse 114. As shown in FIG. 6B, this geometry allows the forces applied to the mechanical fuse 114 to cause a strain on the mechanical fuse 114 to be substantially homogeneous throughout the cross section of the mechanical fuse 114 when a force or torque is applied to the hub 122 and/or the arm 118 (to cause movement of the hub 122 and/or arm 118). In contrast, with reference to FIGS. 7B and 7E, a prior art mechanical fuse 200 that has a circular cross-section or profile has a geometry, such as a cylindrical shear pin, that results in non-homogenous strain through the cross-section of the conventional mechanical fuse such that strain caused by the force, is concentrated in small portion of the cross-section at the point along the circumference of the circular cross-section receiving the force. For instance, if rotation of the arm 118 or hub 122 results in a force being applied to the top of a cylindrical, prior art mechanical fuse 200, the strain on the mechanical fuse 200 is concentrated towards the top of the mechanical fuse 200 such that other portions of the mechanical fuse 200 are not similarly strained. From a geometric perspective, a distance D4 from an axis of rotation to one side of a conventional shear pin 200 is substantially greater than a distance D3 from the axis of rotation to the other side of the conventional shear pin 200.

Figure 7E:
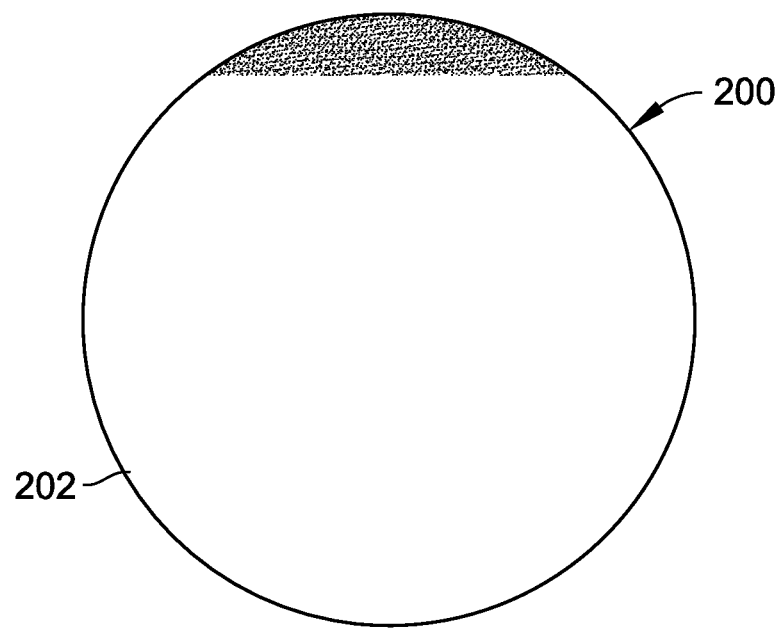
FIG. 7E is a cross-sectional end elevation view illustrating stress in a prior art shear pin for an aviation actuator.

With a torsional load, greater strain will occur father away from the center of rotation. Since stress is proportional to strain, the stress will be less homogenous throughout any cross section (e.g., round or otherwise) when the geometry is wider along the axis of rotation (e.g., as shown and described with reference to FIGS. 7B and 7E) as compared to a flatter (e.g., rectangular) geometry (e.g., as shown and described with reference to FIGS. 6A-6B). Further, as described herein, the fuse body 140 is configured to be generally circumferentially oriented with respect to rotation of the fuse body 140 with the first rotating body/output shaft 116 and the second rotating body/arm 118 to expose the fuse body 140 to at least substantially constant shear stress along its cross-sectional profile (e.g., as described with reference to FIG. 5). Thus, as shown in FIG. 6B, shear stress in the cross-sectional area of the fuse body 140 is not concentrated at the periphery as compared to shear stress in other cross-sectional areas of the fuse body 140. In contrast, as shown in FIG. 7E, stress in the cross-sectional area of a body 202 of a shear pin 200 is localized at the periphery.

Figure 7A:
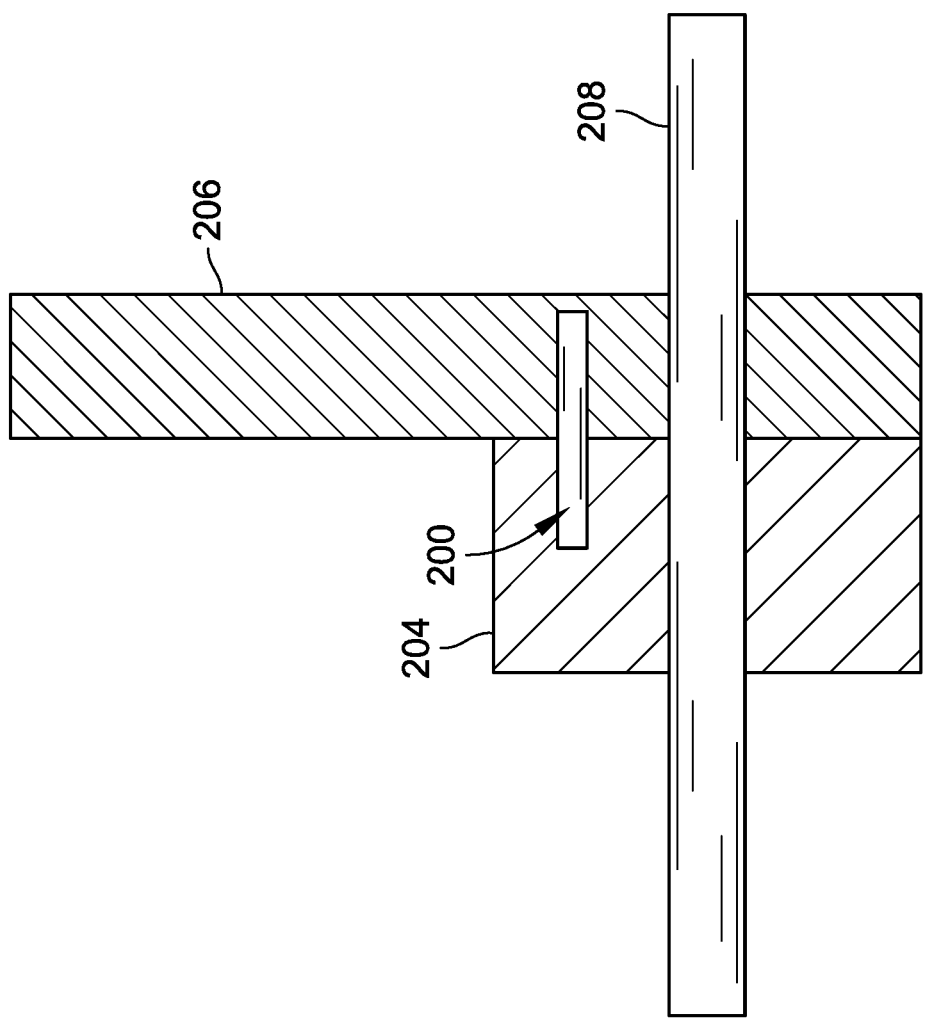
FIG. 7A is a partial cross-sectional side elevation view illustrating a prior art aviation actuator assembly for an aviation autopilot system including a conventional cylindrical mechanical fuse (shear pin) loaded in single shear configuration.
Figure 7C:
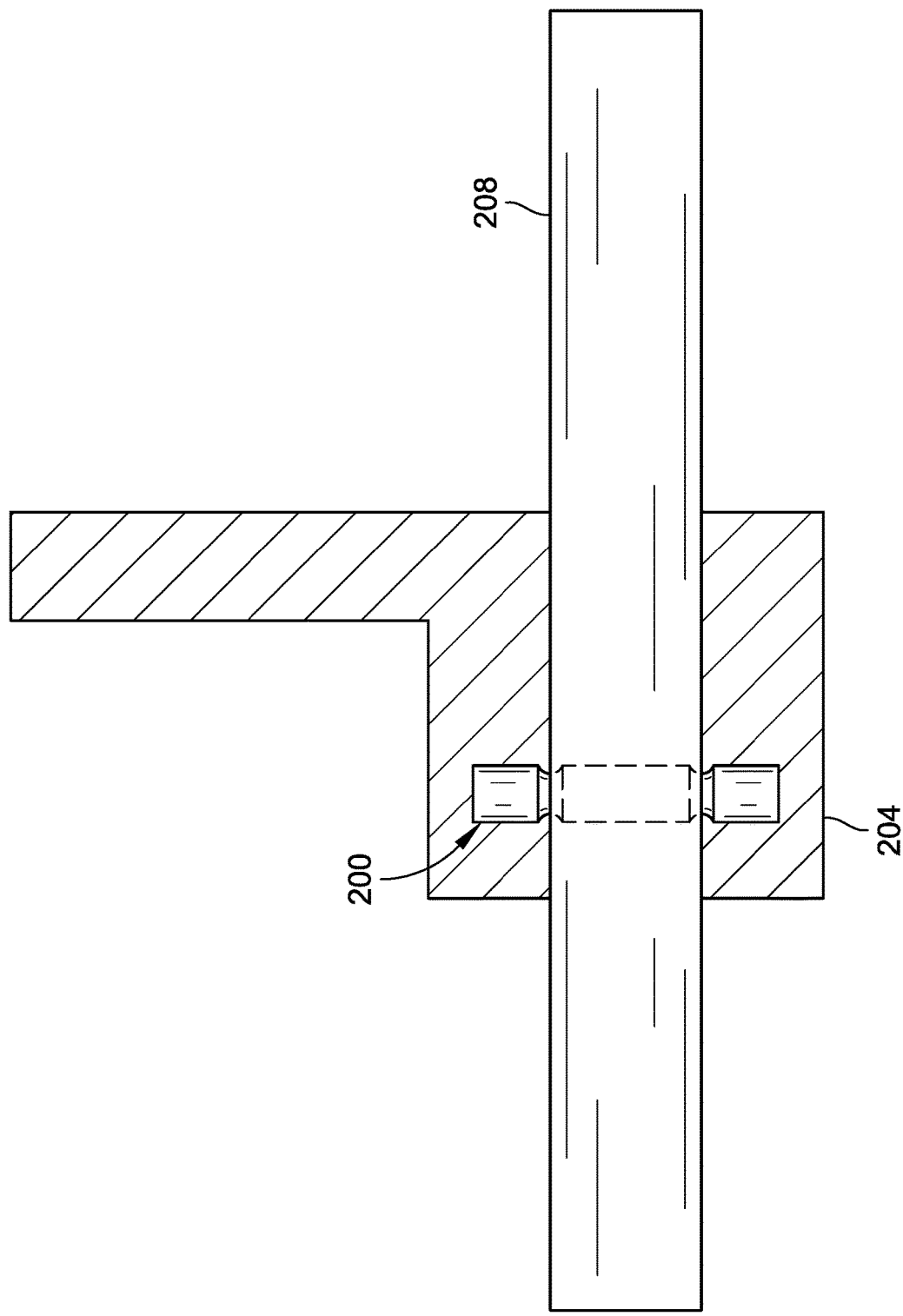
FIG. 7C is a partial cross-sectional side elevation view illustrating a prior art aviation actuator assembly for an aviation autopilot system including a conventional cylindrical mechanical fuse (shear pin) loaded in double shear configuration.

Referring now to FIGS. 7A through 8B, a conventional shear pin 200 with a circular or oval cross-sectional profile along the length of its body 202 may see localized shear stress in a peripheral cross-sectional area of the fuse body 202 as compared to lesser shear stress seen in another cross-sectional area of the fuse body 202. Without wishing to be bound by any particular theory or principle of operations, continued strain concentrated in an a small portion of the conventional shear pin 200 that is not non-homogenous may result in some conventional shear pins 200 failing from fatigue at relatively smaller loads than the configurations of the mechanical fuse 114 described herein. Thus, such conventional shear pins 200 are often replaced at shorter intervals to avoid nuisance fatigue failures resulting from regular use of a conventional aviation actuator assembly. As shown in FIGS. 7A and 7B, an aviation actuator with a shear pin 200 may join a hub 204 to an arm 206, where the hub 204 and the arm 206 rotate around, for instance, a shaft 208. In this configuration, the conventional shear pin 200 is in loaded in single shear configuration. As shown in FIGS. 7C and 7D, an aviation actuator with a conventional shear pin 200 may join a hub 204 to a shaft 208, where the hub 204 rotates around the shaft 208, which may be joined to, for instance, an arm 206. In this configuration, the conventional shear pin 200 is in loaded in a double shear configuration (i.e., with two cross sections loaded in shear on either side of the shaft 208. As seen in FIG. 7D, load on the conventional shear pin 200 in the double shear configuration increases farther from the axis of rotation of the hub 204, which may cause significant bending stresses leading to fatigue failure. The forces on opposing surfaces (top and bottom) of the conventional shear pin 200 results in a top portion on the left shear point being stressed and a bottom portion on the right shear point being stressed. While the configuration shown and described with reference to FIGS. 7A and 7B may reduce or eliminate these bending stresses on conventional shear pin 200, the shear forces are still greater farthest from the center of rotation as previously described.

Figure 7D:
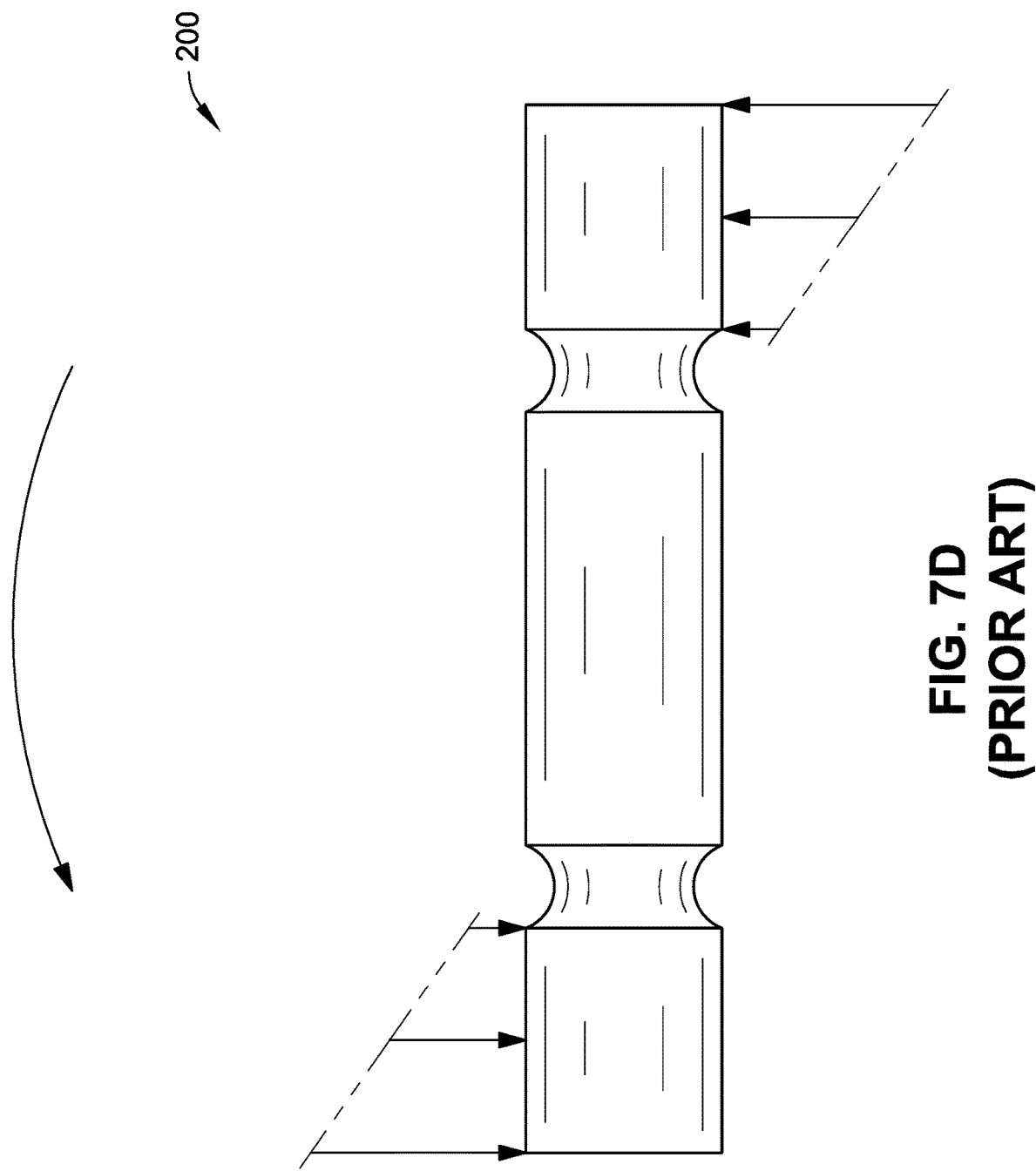
FIG. 7D is a side elevation view illustrating a prior art cylindrical mechanical fuse (shear pin) loaded in double shear and stress points when loaded in a double shear configuration with forces on opposing sides of the mechanical fuse.
Figure 8A:
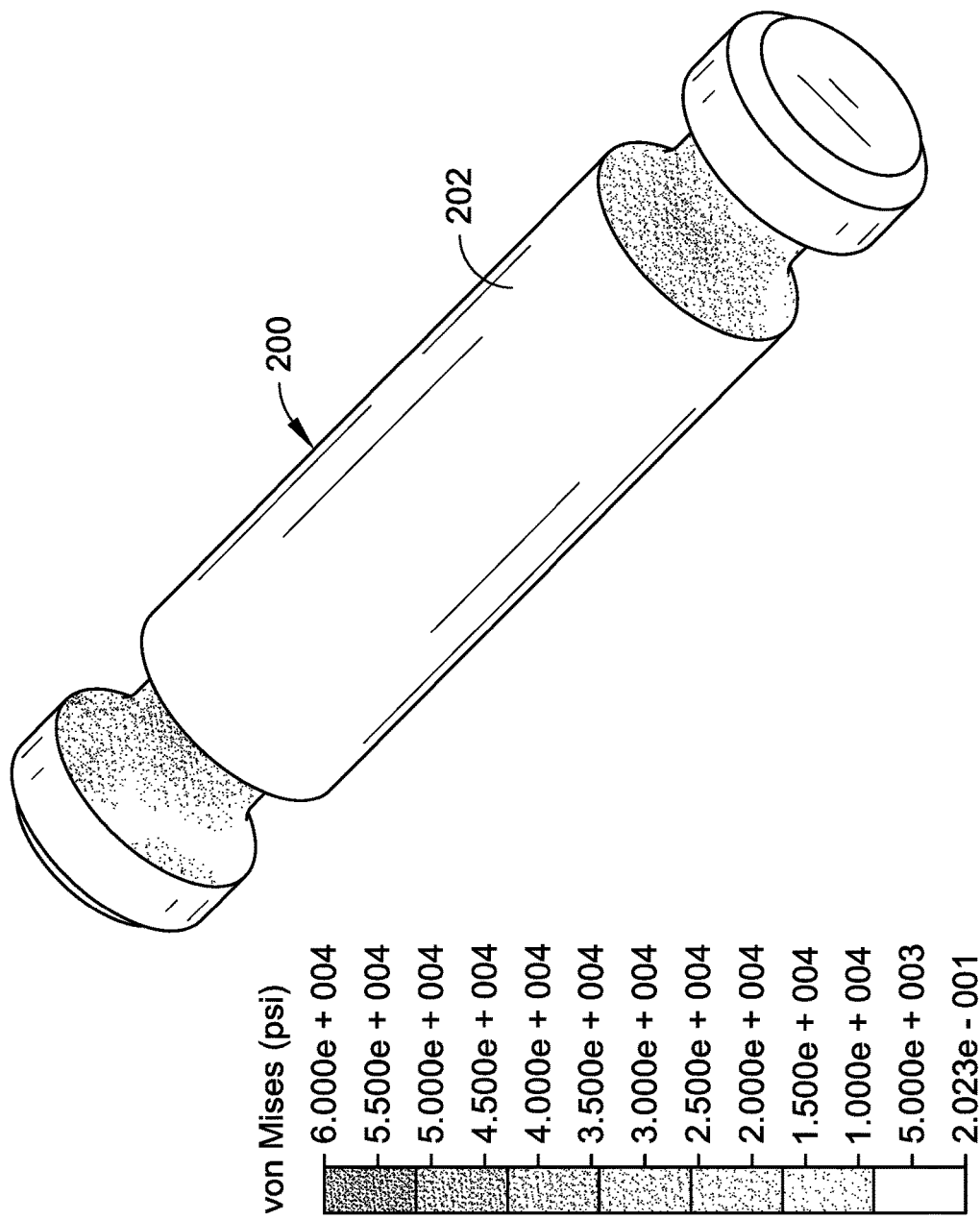
FIG. 8A is an isometric view illustrating a finite element analysis (FEA) representation of a prior art cylindrical shear pin for installing through a shaft of an aviation actuator in a double shear configuration and stress points on the prior art mechanical fuse.
Figure 10:
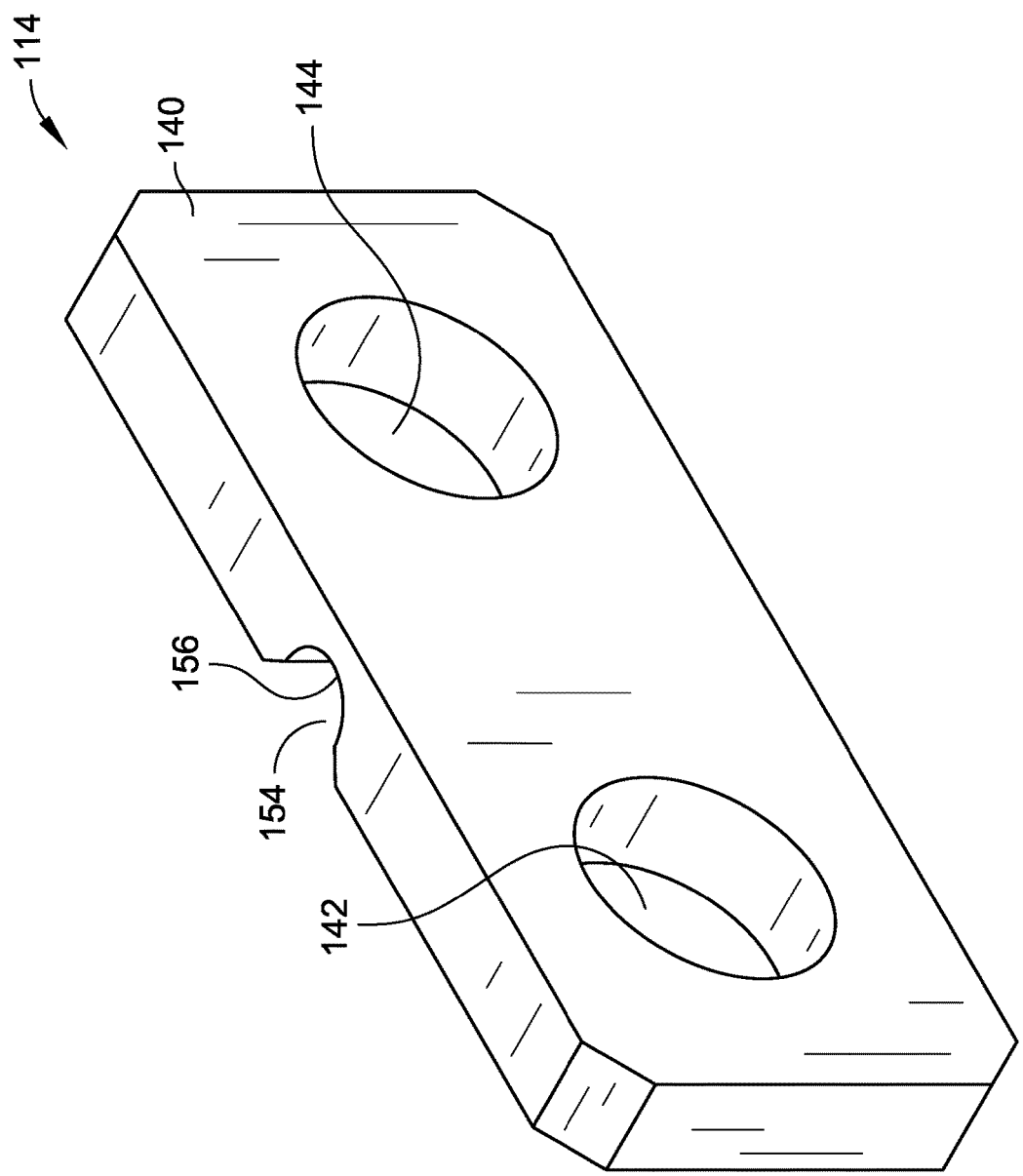
FIG. 10 is an isometric view illustrating a mechanical fuse for an aviation actuator assembly of an aviation autopilot system, such as the aviation autopilot system illustrated in FIG. 1, in accordance with an example embodiment of the present disclosure.
Figure 11:
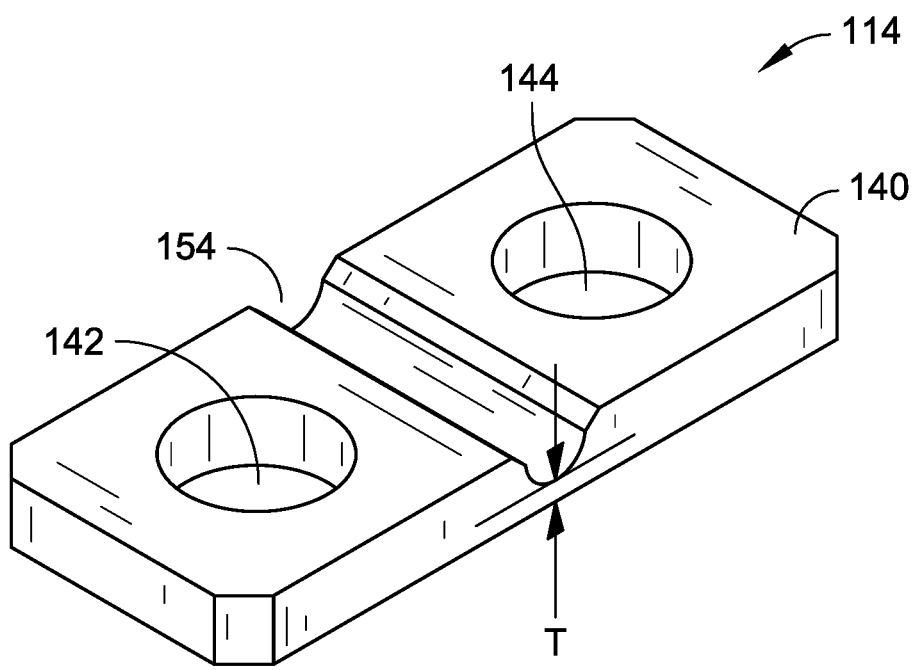
FIG. 11 is another isometric view of the mechanical fuse illustrated in FIG. 10.
Figure 12:
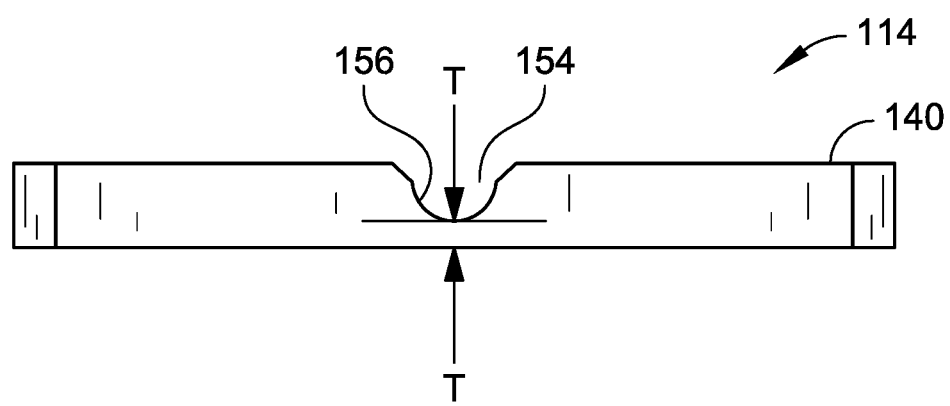
FIG. 12 is a side elevation view of the mechanical fuse illustrated in FIG. 10.
Figure 13:
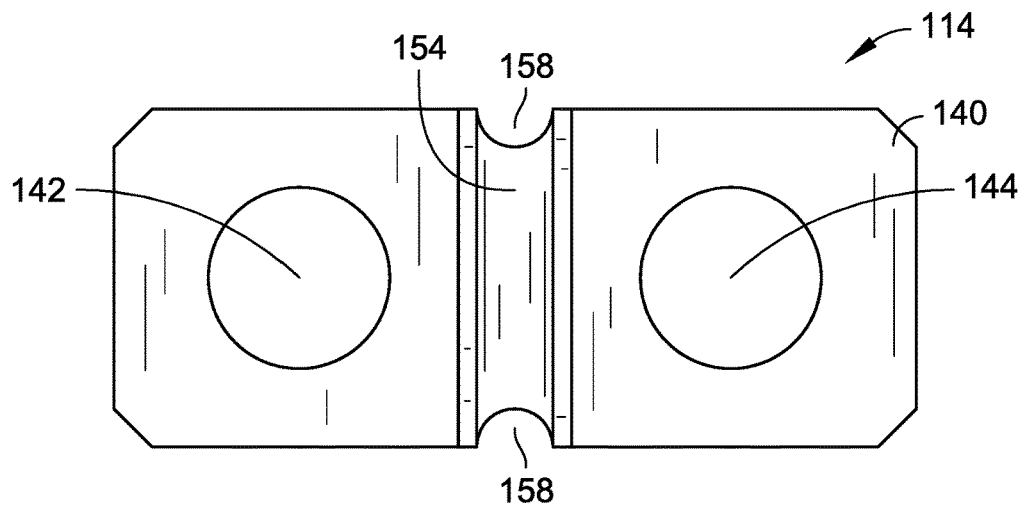
FIG. 13 is a top plan view illustrating a mechanical fuse for an aviation actuator assembly of an aviation autopilot system, such as the aviation autopilot system illustrated in FIG. 1, in accordance with an example embodiment of the present disclosure.
Figure 14:
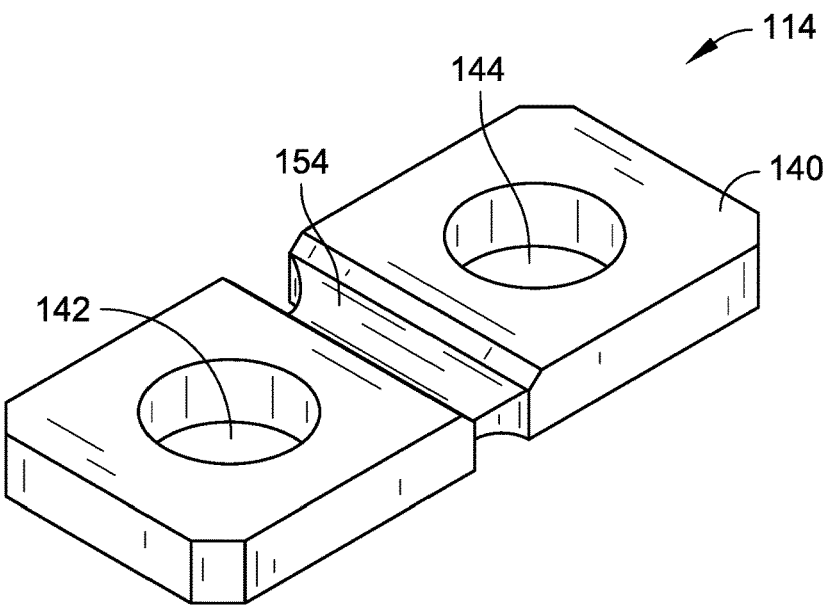
FIG. 14 is an isometric view of the mechanical fuse illustrated in FIG. 13.
Figure 15:
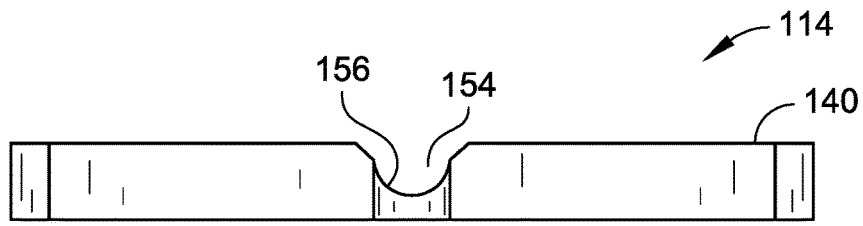
FIG. 15 is a side elevation view of the mechanical fuse illustrated in FIG. 13.
Figure 16:
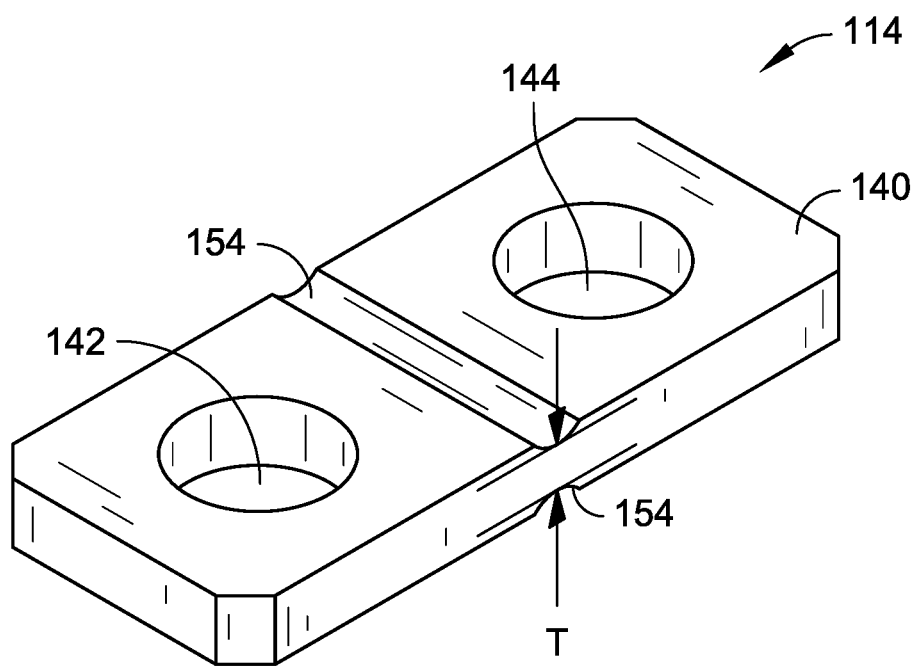
FIG. 16 is an isometric view illustrating a mechanical fuse for an aviation actuator assembly of an aviation autopilot system, such as the aviation autopilot system illustrated in FIG. 1, in accordance with an example embodiment of the present disclosure.
Figure 17:
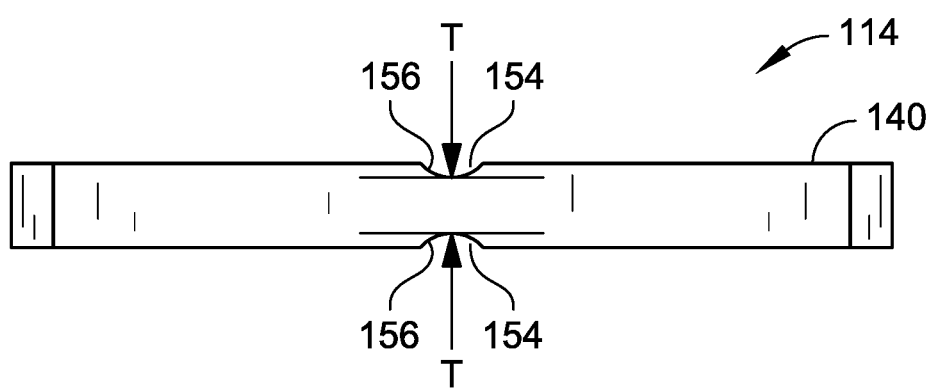
FIG. 17 is a side elevation view of the mechanical fuse illustrated in FIG. 16.
Figure 18:
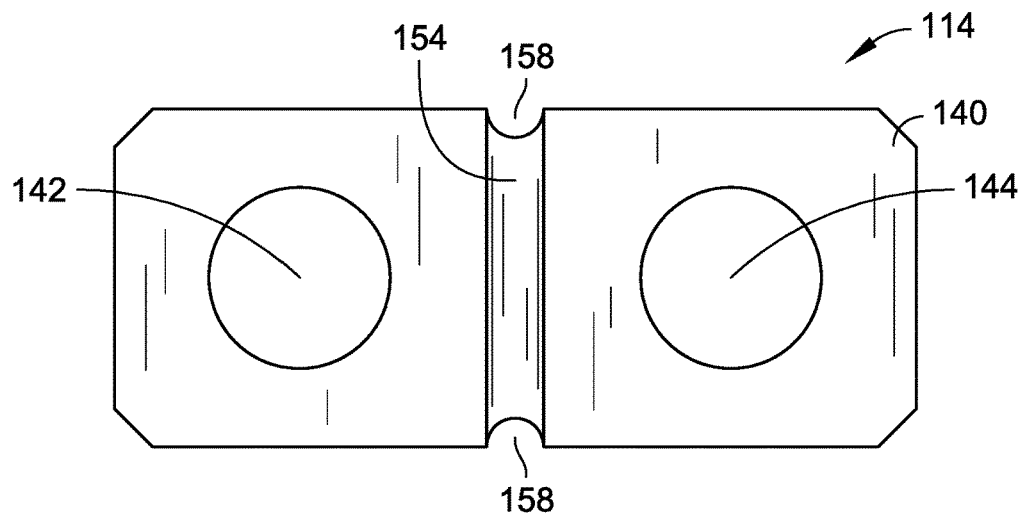
FIG. 18 is a top plan view illustrating a mechanical fuse for an aviation actuator assembly of an aviation autopilot system, such as the aviation autopilot system illustrated in FIG. 1, in accordance with an example embodiment of the present disclosure.
Figure 19:
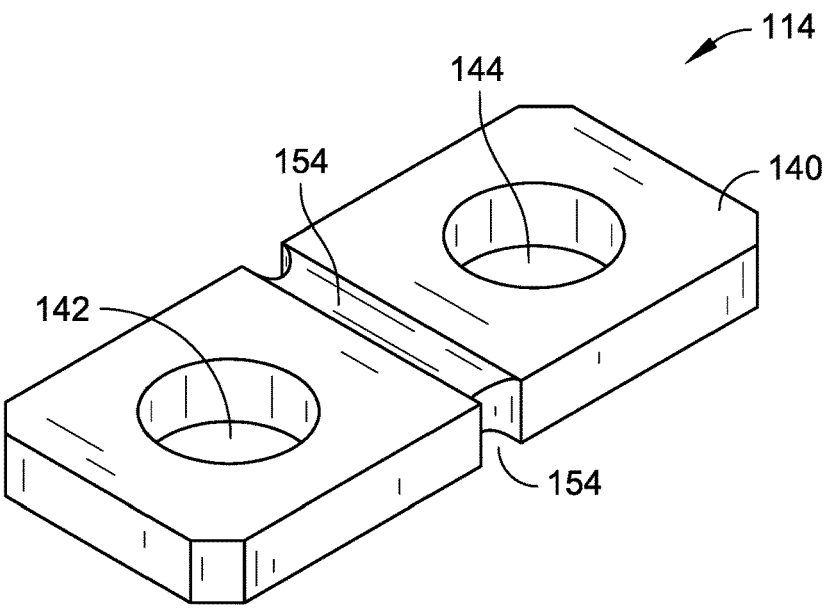
FIG. 19 is an isometric view of the mechanical fuse illustrated in FIG. 18.
Figure 20:
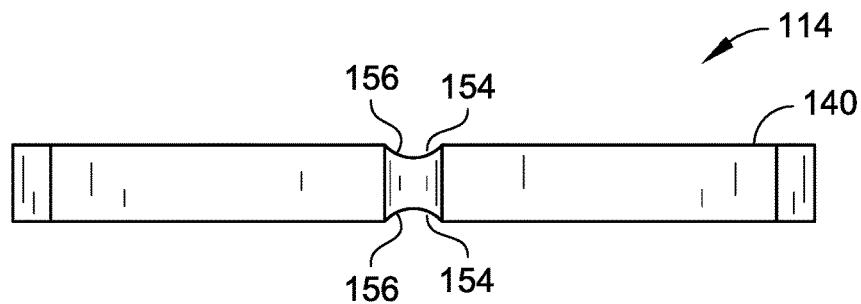
FIG. 20 is a side elevation view of the mechanical fuse illustrated in FIG. 18.

With reference to FIGS. 8A and 8B, a finite element analysis of a cross pin configuration shows highly localized areas of stress on the surface of a conventional shear pin 200, which may be two (2) to three (3) times greater than stress at, for instance, the core/center of the shear pin 200, which may result in premature fatigue and wear as discussed above. Unlike FIG. 7D, FIG. 8B illustrates stress on the top portion of the both double shear points resulting from force(s) subjected to the conventional shear pin 200 from above (as opposed to forces on opposing sides of the conventional shear pin 200). When the conventional shear pin 200 is subjected to repetitive stress cycles, a crack can initiate at the area of high stress and then extend through the part until the remaining cross-sectional area is too small to support the load. In comparison, stress can be much more uniformly distributed with a flat cross section, such as the disclosed mechanical fuse 114, as seen in FIG. 6B.

High stresses at the surface of a conventional shear pin 200 can be due to bending loads, which may exceed the yield limit of the material at relatively low torque and may cause accelerated fatigue. It is also believed that while a conventional shear pin screw configuration may reduce or minimize such bending loads, the load on such a screw can be torsional, where the highest stress is seen at the farthest point from the axis of rotation, as the farthest point sees the most strain (e.g., as described with reference to FIG. 7B). Thus, a shear pin screw may see the greatest stress at a highly localized region farthest away from the center of rotation, i.e., as the surface area of the round profile gets infinitesimally small at the outermost edge.

Referring now to FIG. 9, a finite element analysis of a mechanical fuse 114 configuration where a shear tab/plate, or thin metal strip, forms a mechanical linkage between a shaft and an output arm. The analysis shows that the mechanical fuse 114 is loaded almost entirely in shear, and the thin, flat cross section is a substantially equal distance from the center of rotation, allowing the stress to be nearly homogeneous throughout the cross section. In some embodiments, the mechanical fuse 114 can be formed of a metal material, such as aluminum or steel. For example, the fuse body 140 may be laser cut from stock material and/or may be mechanically machined. However, these materials and processes are provided by way of example and are not meant to limit the present disclosure. In other embodiments, a mechanical fuse 114 can be formed using one or more other materials. Further, the mechanical fuse 114 may be easily and efficiently replaced (e.g., using screws 124 and 126).

Referring now to FIGS. 10 through 20, the fuse body 140 may define one or more channels 154, where each channel 154 extends generally perpendicular to the length of the fuse body 140 and narrows the cross-sectional profile of the fuse body 140. In some embodiments, the fuse body 140 may define a single channel 154 (e.g., as described with reference to FIGS. 10 through 15). In other embodiments, the fuse body 140 may define multiple (e.g., two, three, more than three) channels 154. For example, two channels 154 may be positioned generally opposite one another on opposing faces of the fuse body 140 (e.g., as described with reference to FIGS. 16 through 20). In embodiments of the disclosure, a base 156 of a channel 154 may define a radius to reduce or minimize stress concentrations (e.g., rather than having sharp corners).

In some embodiments, the fuse body 140 may also define one or more additional channels or notches 158 oriented generally perpendicularly to a channel 154 or channels 154. For example, a first notch 158 may be defined on one side of the fuse body 140 and a second notch 158 may be defined generally opposite the first notch 158 on an opposing side of the fuse body 140 (e.g., as described with reference to FIGS. 13 through 15 and 18 through 20). One or more of the notches 158 can also have a base that defines a radius to reduce or minimize stress concentrations. Thus, the fuse body 140 may have a generally hourglass-shaped profile as seen from a top or bottom side, which may have improved fatigue characteristics (e.g., when compared to a profile with flat sides), but may also have increased deflection under shear stress. Thus, the hourglass-shaped profile may be reduced or eliminated in an application where increased deflection while breaking the fuse would not be desired (e.g., for a helicopter application). Thus, the notches 158 are not necessarily included in such applications.

As described herein, the mechanical fuse 114 can be used with servo actuators for helicopter autopilot applications. For example, a mechanical fuse 114 can be used as an overpower mechanism, where, in the rare event that a motor or gear jams within an actuator, the pilot can overpower the actuator by applying enough force to break the mechanical fuse 114. Breaking the mechanical fuse 114 can disconnect the motor and/or gearbox and allow the pilot to continue flying the aircraft by hand. While it is desirable to minimize the force required to break the mechanical fuse 114, the potential for nuisance failures is also addressed by the systems, methods, and techniques described herein. As presently described, the term "nuisance failure" shall be understood to refer to an undesired failure of a mechanical fuse 114. Generally, this may happen as the result of fatigue caused by repetitive stress cycles. Such fatigue failures can be minimized by lowering the stress on the part, but doing so may increase the force needed to break the part (e.g., in the case of a mechanical jam).

Thus, the mechanical fuse 114 addresses both the desire to lower the stress on the part while also providing for a reduction in the force needed to break the fuse. For example, some embodiments of the mechanical fuse 114 described herein may last about 50,000 to 100,000 cycles and beyond at about one-half (½) the breaking strength. Accordingly, the mechanical fuse 114 may be replaced (e.g., to avoid nuisance fatigue failures) at more conveniently scheduled intervals than a shear pin, which may only last about 10,000 cycles at about one-third (⅓) the breaking torque as previously discussed. In some embodiments, the force needed to break the mechanical fuse 114 may be about two and one-half (2.5) times the driving force. With a shear pin, the breaking force may be more than six (6) times the driving force.

In some embodiments, a thickness T, of the cross-section of the mechanical fuse 114 at a channel 154 (e.g., as described with reference to FIGS. 11, 12, 16, and 17) can be used to control the force needed to break the mechanical fuse 114. The mechanical fuse 114 described herein can allow an aviation autopilot system 100 to balance the need to free the control system from an autopilot motor without requiring undue force to do so. Further, the presence of the one or more channels 154 in the fuse body 140 can allow for a precise setting of the necessary force required, while balancing the desire for long part lifetime. For example, the thickness of the cross-section of the fuse body 140 at a channel 154 can be controlled to a tolerance of within one one-thousandth of an inch (0.001") by precision machining of the depth of the channels 154. This configuration may also allow the overall part including the fuse body 140 to be fabricated with less precision (e.g., using laser cutting, machining, and so forth).

Referring again to FIG. 1, an aviation autopilot system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

One or more of the aviation actuator assemblies 102 can be coupled with a controller 160 for controlling a servo 104. For example, a single controller 160 can be coupled with multiple aviation actuator assemblies 102. In other embodiments, an aviation actuator assembly 102 can include a dedicated controller 160 (e.g., contained within a housing for the aviation actuator assembly 102). Various aviation actuator assemblies 102 may communicate over a common data bus, which may be connected to other components of an aviation autopilot system 100, including, but not necessarily limited to: one or more displays, sensors, and so forth. The controller 160 can include a processor 162, a memory 164, and a communications interface 166. The processor 162 provides processing functionality for the controller 160 and can include any number of processors, micro-controllers, or other processing systems, and resident or external memory for storing data and other information accessed or generated by the controller 160. The processor 162 can execute one or more software programs that implement techniques described herein. The processor 162 is not limited by the materials from which it is formed or the processing mechanisms employed therein and, as such, can be implemented via semiconductor(s) and/or transistors (e.g., using electronic integrated circuit (IC) components), and so forth.

The memory 164 is an example of tangible, computer-readable storage medium that provides storage functionality to store various data associated with operation of the controller 160, such as software programs and/or code segments, or other data to instruct the processor 162, and possibly other components of the controller 160, to perform the functionality described herein. Thus, the memory 164 can store data, such as a program of instructions for operating the system 100 (including its components), and so forth. It should be noted that while a single memory 164 is described, a wide variety of types and combinations of memory (e.g., tangible, non-transitory memory) can be employed. The memory 164 can be integral with the processor 162, can comprise stand-alone memory, or can be a combination of both.

The memory 164 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the aviation actuator assemblies 102 and/or the memory 164 can include removable integrated circuit card (ICC) memory, such as memory provided by a subscriber identity module (SIM) card, a universal subscriber identity module (USIM) card, a universal integrated circuit card (UICC), and so on.

The communications interface 166 is operatively configured to communicate with components of the system 100, including, but not necessarily limited to: one or more displays, sensors, other actuators, and so forth. Further, the communications interface 166 can be configured to communicate with a data bus that communicates with other components, such as one or more displays, sensors, other actuators, and so on. For example, the communications interface 166 can be configured to transmit data for storage in the system 100, retrieve data from storage in the system 100, and so forth. The communications interface 166 is also communicatively coupled with the processor 162 to facilitate data transfer between components of the system 100 and the processor 162 (e.g., for communicating inputs to the processor 162 received from a device communicatively coupled with the controller 160). It should be noted that while the communications interface 166 is described as a component of a controller 160, one or more components of the communications interface 166 can be implemented as external components communicatively coupled to the system 100 via a wired and/or wireless connection. The system 100 can also comprise and/or connect to one or more input/output (I/O) devices (e.g., via the communications interface 166), including, but not necessarily limited to: a display, a mouse, a touchpad, a keyboard, and so on.

The communications interface 166 and/or the processor 162 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 166 can be configured to communicate with a single network or multiple networks across different access points.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An aviation actuator assembly comprising:
   an actuator having an output shaft;
   a mechanical fuse joining the output shaft of the actuator and a rotating body to connect the output shaft and the rotating body together and impart a rotational force from the output shaft to the rotating body, the output shaft and the rotating body sharing a common axis of rotation, the mechanical fuse comprising:
   a fuse body having a first connection point for joining to the output shaft and a second connection point for joining to the rotating body, the first connection point and the second connection point disposed in a line parallel to the common axis of rotation, and the first connection point and the second connection point each disposed at a radial distance from the common axis of rotation when joined to the output shaft and the second rotating body;
   at least one channel defined in the fuse body, the fuse body having a rectangular cross-sectional profile along a length of the fuse body between the first connection point and the second connection point, the at least one channel extending perpendicular to the length of the fuse body and narrowing the cross-sectional profile at the channel, the fuse body circumferentially oriented with respect to rotation of the fuse body with the output shaft and the second rotating body to expose the fuse body to substantially constant shear stress along the cross-sectional profile; and
   at least one notch oriented perpendicularly to the at least one channel.

2. The aviation actuator assembly as recited in claim 1, wherein a first radial distance of the first connection point from the common axis of rotation and a second radial distance of the second connection point from the common axis of rotation are at least substantially the same.

3. The aviation actuator assembly as recited in claim 1, wherein the mechanical fuse defines a second channel in the fuse body opposite the at least one channel.

4. The aviation actuator assembly as recited in claim 1, wherein the at least one channel comprises a base defining a radius.

5. The aviation actuator assembly as recited in claim 1, wherein the fuse body defines a second notch oriented perpendicularly to the at least one channel, the second notch opposite the at least one notch.

6. A mechanical fuse joining a first rotating body and a second rotating body to connect the first rotating body and the second rotating body together and impart a rotational force from one of the first rotating body and the second rotating body to the other of the first rotating body and the second rotating body, the first rotating body and the second rotating body sharing a common axis of rotation, the mechanical fuse comprising:
   a fuse body having a first connection point for joining to the first rotating body and a second connection point for joining to the second rotating body, the first connection point and the second connection point disposed in a line parallel to the common axis of rotation, and the first connection point and the second connection point each disposed at a radial distance from the common axis of rotation when joined to the first rotating body and the second rotating body;
   at least one channel defined in the fuse body, the fuse body having a rectangular cross-sectional profile along a length of the fuse body between the first connection point and the second connection point, the at least one channel extending perpendicular to the length of the fuse body and narrowing the cross-sectional profile at the channel, the fuse body circumferentially oriented with respect to rotation of the fuse body with the first rotating body and the second rotating body to expose the fuse body to substantially constant shear stress along the cross-sectional profile, wherein a first radial distance of the first connection point from the common axis of rotation and a second radial distance of the second connection point from the common axis of rotation are substantially the same; and
   at least one notch oriented perpendicularly to the at least one channel.

7. The mechanical fuse as recited in claim 6, further comprising a second channel in the fuse body opposite the at least one channel.

8. The mechanical fuse as recited in claim 6, wherein the at least one channel comprises a base defining a radius.

9. The mechanical fuse as recited in claim 6, wherein the fuse body defines a second notch oriented perpendicularly to the at least one channel, the second notch opposite the at least one notch.

10. A mechanical fuse joining a first rotating body and a second rotating body to connect the first rotating body and the second rotating body together and impart a rotational force from one of the first rotating body and the second rotating body to the other of the first rotating body and the second rotating body, the first rotating body and the second rotating body sharing a common axis of rotation, the mechanical fuse comprising:

a fuse body having a first connection point for joining to the first rotating body and a second connection point for joining to the second rotating body, the first connection point and the second connection point disposed in a line parallel to the common axis of rotation, and the first connection point and the second connection point each disposed at a radial distance from the common axis of rotation when joined to the first rotating body and the second rotating body;

at least one channel defined in the fuse body, the fuse body having a rectangular cross-sectional profile along a length of the fuse body between the first connection point and the second connection point, the at least one channel generally perpendicular to the length of the fuse body and narrowing the cross-sectional profile at the channel, the fuse body circumferentially oriented with respect to rotation of the fuse body with the first rotating body and the second rotating body to expose the fuse body to substantially constant shear stress along the cross-sectional profile; and at least one notch oriented perpendicularly to the at least one channel.

11. The mechanical fuse as recited in claim 10, wherein a first radial distance of the first connection point from the common axis of rotation and a second radial distance of the second connection point from the common axis of rotation are at least substantially the same.

12. The mechanical fuse as recited in claim 10, further comprising a second channel in the fuse body opposite the at least one channel.

13. The mechanical fuse as recited in claim 10, wherein the at least one channel comprises a base defining a radius.

14. The mechanical fuse as recited in claim 10, wherein the fuse body defines a second notch oriented perpendicularly to the at least one channel, the second notch opposite the at least one notch.

* * * * *